US005330824A

United States Patent [19]

Takimoto et al.

[11] Patent Number: 5,330,824

[45] Date of Patent: Jul. 19, 1994

[54] IMAGE PROTECTING FILM AND IMAGE PROTECTING METHOD

[75] Inventors: Hiroshi Takimoto, Yokohama; Minoru Masuda, Machida, both of Japan

[73] Assignee: Mitsubishi Kasei Corporation, Tokyo, Japan

[21] Appl. No.: 951,325

[22] Filed: Sep. 25, 1992

Related U.S. Application Data

[63] Continuation of Ser. No. 547,145, Jul. 3, 1990, abandoned.

[30] Foreign Application Priority Data

Jul. 4, 1989 [JP] Japan ................................ 1-172178

[51] Int. Cl.[5] ............................................ B32B 27/36

[52] U.S. Cl. .................................. 428/201; 428/203; 428/204; 428/205; 428/211; 428/216; 428/334; 428/335; 428/336; 428/412; 428/421; 428/473.5; 428/480; 428/481; 428/483

[58] Field of Search .................... 156/324.4; 428/201, 428/203, 204, 205, 211, 216, 334, 335, 336, 412, 421, 473.5, 480, 483, 481

[56] References Cited

U.S. PATENT DOCUMENTS 4,291,153 9/1981 Noonan et al. .................... 528/290
4,426,478 6/1984 Noyes et al. ....................... 524/361
4,476,189 10/1984 Posey et al. ......................... 428/336
4,732,964 3/1988 Myers ................................. 428/480
4,977,136 12/1990 Fujiwara et al. .................. 503/227

FOREIGN PATENT DOCUMENTS 0273347 7/1988 European Pat. Off. .
1118133 5/1989 Japan .

*Primary Examiner*—D. S. Nakarani
*Attorney, Agent, or Firm*—Oblon, Spivak, McClelland, Maier & Neustadt

[57] ABSTRACT

An image protecting film useful for protecting an image recorded on a porous recording medium by an ink jet recording system, which film comprises a light transmitting non-porous support and a layer composed mainly of a polyester resin formed on the support, said polyester resin being a copolymer comprising aliphatic dicarboxylic acid units, aromatic dicarboxylic acid units and aliphatic polyol units. Also disclosed is an image protecting method which comprises overlaying the above image protecting film on a porous recording medium having an image recorded thereon, so that the layer composed mainly of the polyester resin is in contact with the recording medium, followed by hot press bonding. The image protected by the image protecting film and the image protecting method of the present invention is excellent in the light resistance, the water resistance and the color development.

9 Claims, No Drawings

IMAGE PROTECTING FILM AND IMAGE PROTECTING METHOD

This application is a continuation of application Ser. No. 07/547,145, filed on Jul. 3, 1990, now abandoned.

TITLE OF THE INVENTION

BACKGROUND OF THE INVENTION

1. Field of the Invention

The present invention relates to an image protecting film useful for imparting gloss to a printed image formed by printing or various recording methods, or for protecting such a printed image from water and light. More particularly, the present invention relates to an image protecting film suitable for protecting a printed image formed by an ink jet recording method.

2. Discussion of the Background

An ink jet recording system has found a rapid spread in recent years because of its merits such that it produces little noise, makes multi-coloring possible, and simplifies formation of a large image, and the running cost is small.

The recording medium to be used for the ink jet recording includes, in addition to ordinary paper and coated paper, a plastic film having a porous surface layer, and a non-porous hydrophobic plastic film having an ink accepting layer comprising organic or inorganic fine particles and a binder resin coated thereon.

As the recording liquid for such ink jet recording, an aqueous type is mainly used from the viewpoint of safety and printing properties. Accordingly, it is preferred for the recording medium to have an ink accepting layer on the non-porous film, made of a hydrophilic substance. On the other hand, high water resistance and light resistance are required for the printed matters obtained by such recording, particularly for printed matters for display or exhibition inside or outside the buildings or automobiles. To satisfy such requirements, methods of laminating plastic films on such printed matters, have been proposed, for example, in Japanese Unexamined Patent Publications No. 56184/1987, No. 59076/1987, No. 60683/1987, No. 202794/1987, No. 273889/1987, No. 273890/1987, No. 280085/1987 and No. 280086/1987.

However, such conventional laminating methods had difficulties such that the color development was inadequate, and when the laminated film and the printed matter were of the same size, or when a necessary portion was cut after the lamination, sealing along the edge was difficult, and it was difficult to prevent a problem such that water penetrated from the edge tends to blot the printed image.

Further, Japanese Unexamined Patent Publications No. 161583/1987 and No. 280086/1987 disclose a method in which an acrylic resin or paraffin wax is coated on a printed image. However, this method can hardly be said to be practically acceptable.

SUMMARY OF THE INVENTION

It is an object of the present invention to provide an image protecting film for protecting by a laminate a printed image formed by an ink jet system, which is capable of providing particularly excellent water resistance and color development, and an image protecting method using such a film.

The present invention is based on a discovery that the above-mentioned problems of the conventional methods can be solved by laminating on the printed image a light transmitting non-porous support having a certain compound coated at the bonding surface.

Thus, the present invention provides an image protecting film useful for protecting an image recorded on a porous recording medium by an ink jet recording system, which film comprises a light transmitting non-porous support and a layer composed mainly of a polyester resin formed on the support, said polyester resin being a copolymer comprising aliphatic dicarboxylic acid units, aromatic dicarboxylic acid units and aliphatic polyol units.

The present invention also provides an image protecting method which comprises overlaying such an image protecting film on an image recorded on a porous recording medium by an ink jet recording system, so that the layer composed mainly of the polyester resin is in contact with the image, followed by hot press bonding.

DETAILED DESCRIPTION OF THE PREFERRED EMBODIMENTS

Now, the present invention will be described in further detail with reference to the preferred embodiments.

The image protecting film of the present invention comprises a light transmitting non-porous support and a layer composed mainly of the polyester resin formed on the support. This polyester resin is a copolymer comprising aliphatic dicarboxylic acid units, aromatic dicarboxylic acid units and aliphatic polyol units.

The aliphatic dicarboxylic acid units are derived from at least one of saturated or unsaturated aliphatic dicarboxylic acids such as malonic acid, succinic acid, glutaric acid, adipic acid, sebacic acid, fumaric acid, maleic acid, itaconic acid and glutaconic acid. The aromatic dicarboxylic acid units are derived from at least one of aromatic dicarboxylic acids such as terephthalic acid and isophthalic acid. Likewise, the aliphatic polyol units are derived from at least one of aliphatic polyols such as ethylene glycol, propylene glycol, butylene glycol, hexylene glycol, diethylene glycol, polyethylene glycol, polypropylene glycol, neopentyl glycol and glycerol. Specifically, such a polyester resin having the respective units can be prepared by reacting the aliphatic dicarboxylic acid, the aromatic dicarboxylic acid and the aliphatic polyol constituting the respective units in the presence of an acid or alkali catalyst to obtain a copolymer.

Such a polyester resin preferably has a molecular weight $\overline{M}_n$ of from 5,000 to 25,000. From the viewpoint of the convenience for hot press bonding (the hot press temperature being low) or the compatibility with the coated layer of the recording medium, it preferably has a melting point (softening point) of from 50° to 130° C. and a glass transition temperature of from −30° to 40° C. Further, its melt viscosity is preferably from 700 to 3,000 poise (200° C.).

For the polyester resin to have the above properties, the molar ratio of the aliphatic dicarboxylic acid units to the aromatic dicarboxylic acid units among the total dicarboxylic acid units of the aliphatic and aromatic dicarboxylic acid units, is preferably from 8:2 to 2:8.

Such a polyester resin can be prepared by reacting the aliphatic dicarboxylic acid, the aromatic dicarboxylic acid and the polyol for copolymerization, as mentioned above. However, it is convenient to use a commercially available product, such as the one available under a tradename VYLON 300, 500, GX590, GX130 or GXS11 from Toyo Boseki K.K., or under a tradename Polyester LP033, 044 or 035 from Nippon Gosei Kagaku Kogyo K.K.

As the light transmitting non-porous support, a film of e.g. an aromatic polyester, an acrylate polymer, a polyvinylidene fluoride, a polycarbonate, a polyimide or a polyvinyl chloride, can be used. The film thickness is preferably from 30 to 100 μm. These films may be used alone or may be used in combination in a laminated form. The layer composed mainly of the above-mentioned polyester resin is formed on such a film by coating. The thickness (dry) of such a layer is preferably from 5 to 40 μm.

For the coating, a usual coating means such as a bar coater, a die coater, a gravure coater, a knife coater, a reverse roll coater or a hot melt coater, may be employed. In such coating methods except for the method of using the hot melt coater, the above-mentioned polyester resin can be coated as dissolved or dispersed in a suitable solvent, e.g. a ketone such as methyl ethyl ketone, an ester such as ethyl acetate, an alcohol such as isopropyl alcohol, or an aromatic solvent such as toluene, xylene or chlorobenzene, in a concentration of from 10 to 30% by weight. Further, a cross-linking agent to improve the blocking resistance may be added to the polyester resin layer. An antioxidant, an ultraviolet absorber or any other resins, may be incorporated, as the case requires.

Now, the image protecting method of the present invention will be described.

Namely, the present invention provides an image protecting method for protecting an image recorded on a recording medium by an ink jet recording system, which comprises overlaying, on a porous recording medium having an image recorded thereon, an image protecting film comprising a light transmitting non-porous support and a layer composed mainly of a polyester resin formed on the support, said polyester resin being a copolymer comprising an aliphatic dicarboxylic acid units, aromatic dicarboxylic acid units and aliphatic polyol units, so that the layer composed mainly of a polyester resin is in contact with the recording medium, followed by hot press bonding.

In the present invention, there is no particular restriction as to the recording medium to be recorded by the ink jet recording system, and it is selected from the recording medium commonly employed. Specifically, in addition to bond paper, electrophotographic paper, and coated paper having e.g. zeolite coated on high quality paper, there may be employed a recording medium having a coated layer formed on the surface of a non-porous plastic film made of a plastic such as polyester, polyvinyl chloride or polystyrene by coating a coating liquid comprising a hydrophilic resin such as polyvinyl acetate, polyvinyl alcohol, polyvinyl pyrrolidone, polyamide, polyoxazoline, polyvinylamine, polyethyleneimine, hydroxypropyl cellulose, ethyl cellulose, polyamideepoxy, polyester urethane or polyether urethane, and organic or inorganic fine particles such as colloidal silica, aerosil, fine alumina powder, fine zirconia powder, fine particles of a urea-formalin resin or fine particles of a benzoguanamine resin by a usual coating method using a bar coater or the like. As a specific example of the above recording medium, the one having a coating film containing an ionomer type (polyester or polyether) aqueous urethane resin having carboxyl groups and organic and/or inorganic fine particles, formed on a non-porous support, as disclosed in EP-A-339,604 (which is incorporated by reference herein), can be preferably employed.

Such recording medium provided with a coated layer is hydrophilic and porous, whereby not only printing with an aqueous ink by an ink jet system is possible, but also it has a feature that it has good compatibility with the polyester resin constituting the image protecting film of the present invention, so that in the hot press bonding step, the melt of the polyester resin readily penetrates into the above coated layer on the recording medium.

The printed matter to be protected by the present invention is an image recorded by an ink jet system on the above-mentioned porous recording medium.

In this case, for the recording by an ink jet system, a conventional ink jet system is employed. For example, there may be mentioned an ink jet system of the type wherein an ink is jetted from a nozzle by means of e.g. a piezoelectric element, or an ink is jetted from a nozzle by means of air bubbles generated under heating.

The recording liquid used for forming a printed image to be protected by the image protecting film of the present invention, contains a colorant, water, a hydrophilic organic solvent and, if necessary, a dispersing agent. As the colorant, a dye or pigment is employed. As the dye, azodyes, phthalocyanine dyes or quinophthalone dyes may be used. Particularly preferred are C.I. Direct Yellow-86 or 142, C.I. Acid Red-35 or 37, C.I. Direct Blue-86 or 199, C.I. Direct Black-154 and C.I. Food Black-2. On the other hand, as the pigment, azopigments, phthalocyanine pigments or quinacridone pigments as well as carbon black may be used. Particularly preferred are C.I. Pigment Yellow-74 or 154, C.I. Pigment Red-5 or 122 and C.I. Pigment Blue-15.

For the image protecting method of the present invention, the recording liquid to be used may be of a dye type or a pigment type. However, from the viewpoint of the light resistance of the image to be protected, a pigment type is usually preferred, and the image protecting film of the present invention is suitable also for the protection of the recorded image by a recording liquid of a pigment type. The content of the dye or pigment in the recording liquid is usually within a range of from 0.5 to 10% by weight, preferably from 1 to 7% by weight, relative to the total weight of the recording liquid.

Further, when a pigment is employed as the colorant, it is preferred to employ a dispersing agent. As such a dispersing agent, an anionic type, a nonionic type or a cationic type may be employed. From the viewpoint of the safety, an anionic type and a nonionic type are preferred. As the anionic type dispersing agent, a styrene-maleic acid copolymer, a diisobutylene maleic acid copolymer, a poly(meth)acrylic acid, (meth)acrylic acid ester-(meth)acrylic acid copolymer, and a salt of naphthalene sulfonic acid-formaldehyde condensed polymer may be mentioned. As the nonionic dispersing agent, polyoxyethylene alkyl phenyl ethers, polyoxyethylene alkyl ethers, polyoxyethylene-fatty acid esters, polyoxyethylene alkylamines or polyoxyethylene-polyoxypropylene copolymer may be mentioned.

Such a dispersing agent is used in an amount within a range of from 10 to 100% by weight relative to the pigment.

Further, as the hydrophilic organic solvent, ethylene glycol, propylene glycol, butylene glycol, diethylene glycol, triethylene glycol, polyethylene glycol (#200), polyethylene glycol (#400), glycerol, N-methyl-pyrrolidone, N-ethyl-pyrrolidone, N-vinyl-pyrrolidone, 1,3-dimethyl-imidazolidinone, ethylene glycol monoallyl ether, ethylene glycol monomethyl ether, or diethylene glycol monomethyl ether, is preferred. The content of the hydrophilic organic solvent is usually within a range of from 0 to 50% by weight, based on the total weight of the recording liquid.

The recording liquid used in the present invention, may contain various other additives, as the case requires. As such a recording liquid, known recording liquids as described in e.g. Japanese Unexamined Patent Publications No. 12105/1972, No. 29546/1980 and No. 147863/1981 (which are incorporated by references herein), may be employed.

After recording an image on the porous recording medium by an ink jet system by means of such a recording liquid, the above described protecting film of the present invention is hot-pressed and laminated on the recording surface, whereby the image will be protected.

In the present invention, the hot press bonding is conducted at a temperature of from 80° to 150° C., preferably from 90° to 130° C. under a pressing pressure of from 1 to 10 kg/cm$^2$, preferably from 2 to 6 kg/cm$^2$. As the method for the hot press bonding, any means may be employed so long as the temperature and pressure conditions can be selected. Specifically, an iron or a laminator may be employed.

Now, the present invention will be described in further detail with reference to Examples. However, it should be understood that the present invention is by no means restricted by such specific Examples.

EXAMPLE 1

Using a polyvinyl chloride film having a thickness of 200 μm as a support, a composition comprising 50 parts by weight (resin solid content: 30%) of an ionomer-type polyester urethane resin (Hydran HW-310, tradename, manufactured by Dainippon Ink Kagaku Kogyo K.K.), 2.5 parts by weight (resin solid content: 30%) of an acrylate resin (Voncoat V, tradename, manufactured by Dainippon Ink Kagaku Kogyo K.K.), 0.1 part by weight of Demol EP (polycarboxylate surfactant, manufactured by Kao Corporation), 0.1 part by weight of Fluorad FC-170C (fluorine-type nonionic surfactant, manufactured by 3M Co.) and 12 parts by weight of a urea-formaldehyde resin (particle size: 0.1-3 μm), was coated as an ink absorbing layer by a bar coater method on the film so that the dried layer thickness would be 20 μm, followed by drying at 80° C. for 10 minutes to obtain a recording medium. To the recording medium thus obtained, ink jet recording was conducted by means of an ink jet printer Iϕ-730 (manufactured by Sharp Corporation) ejecting an ink by a piezoelectric oscillator, to obtain a recorded image.

A composition comprising 50 parts by weight of a polyester resin with a composition of dicarboxylic acid units being terephthalic acid:isophthalic acid:adipic acid=29:31:40 (a molar ratio), and with a composition of diol units being ethylene glycol:neopentyl glycol=45:55 (a molar ratio) (VYLON 50AS, tradename, molecular weight: $\overline{M}_n$ 20,000 to 25,000, softening point: 114° C., glass transition point: 4° C., melt viscosity (200° C.): 700 p, manufactured by Toyo Boseki K.K.), 2 parts by weight of a vinylidene chloride resin (ARON CX-S, tradename, manufactured by Toa Gosei Chemical Industries Co., Ltd.), 20 parts by weight of methyl ethyl ketone and 80 parts by weight of chlorobenzene, was coated on a vinylidene fluoride film having a thickness of 50 μm (Kureha KFC AT-50Y, tradename, manufactured by Kureha Chemical Industries Co., Ltd.) by a bar coater method, so that the dried layer thickness would be 20 μm, followed by drying at 80° C. for 5 minutes to obtain a laminated film. This laminated film was hot-press-bonded on the above-mentioned recorded image under such lamination conditions that the surface temperature was 120° C. and the pressing pressure was 5 kg/cm$^2$. The light resistance, the water resistance and the color development of the recorded image were excellent.

EXAMPLE 2

Using a polyethylene terephthalate film having a thickness of 100 μm as a support, a composition comprising 50 parts by weight (resin solid content: 30%) of an aqueous polyvinyl pyrrolidone solution and 20 parts by weight of colloidal silica (particle size: 10–100 nm), was coated as an ink absorbing layer on the film by a bar coater method so that the dried layer thickness would be 15 μm, followed by drying to obtain a recording medium. A recorded image was formed thereon in the same manner as in Example 1. A composition comprising 30 parts by weight of a polyester resin (with a composition of dicarboxylic acid units being terephthalic acid:sebacic acid=69:31 (a molar ratio), and with a composition of diol units being ethylene glycol:neopentyl glycol=46:54 (a molar ratio) (Polyester LP033, tradename, molecular weight: 16,000, flow initiating temperature: 84° C., glass transition temperature: 15° C., melt viscosity (190° C.): 150 p, manufactured by Nippon Gosei Chemical Industries Co., Ltd.) and 70 parts by weight of toluene, was coated on a polyester film having a thickness of 150 μm (Lumirror W#150, tradename, manufactured by Toray Industries) by a bar coater method, so that the dried layer thickness would be 15 μm, followed by drying at 90° C. for 10 minutes, to obtain a laminated film. This laminated film was hot-press-bonded on the above recording image at a surface temperature of 105° C. under a pressing pressure of 4 kg/cm$^2$. The light resistance, the water resistance and the color development of the recorded image were excellent.

EXAMPLE 3

An image protecting film was prepared in the same manner as in Example 1 except that instead of the aliphatic polyester resin (Vylon 50AS, tradename, manufactured by Toyo Boseki K.K.) and the dried layer thickness of 20 μm in Example 1, a polyester resin with a composition of dicarboxylic acid units being terephthalic acid:isophthalic acid:sebacic acid=35:35:30 (a molar ratio), and with a composition of diol units being ethylene glycol:neopentyl glycol=30:70 (a molar ratio) (Polyester LP044, tradename, molecular weight: $\overline{M}_n$ 7,000, flow initiation temperature: 56° C., glass transition point: 20° C., melt viscosity (150° C.): 300 p, manufactured by Nippon Gosei Chemical Industries Co., Ltd.) and the dried layer thickness of 30 μm, was employed.

On the other hand, the image to be protected was formed on the same recording medium as used in Example 1 with one of the following recording liquids by means of the same ink jet printer Iϕ-730 (manufactured by Sharp Corporation) as used in Example 1. Then, the above protecting film was hot-press-bonded thereon in the same manner as in Example 1. As a result, the water resistance, the light resistance and the color development of the image were excellent.

| Preparation of recording liquids | |
|---|---|
| Composition: | |
| Glycerol | 20 parts |
| Pigment* | 3 parts |
| Polystar S-2-1020 (styrene-maleic acid type dispersing agent, tradename, manufactured by Nippon Oil and Fats Co., Ltd.) | 2 parts |
| Water | the rest |
| Total | 100 parts |

The above respective components were put into a container and subjected to pulverization treatment for 20 hours by means of a sand grinder (manufactured by Igarashi Kikai Seizo K.K.) together with 130 ml of glass beads having an average particle size of 0.5 mm. Filtration under pressure was conducted by means of a Teflon (tradename) filter having a pore size of 3 μm, and deaerating treatment was conducted by means of a vacuum pump and a ultrasonic cleaning machine to obtain a recording liquid.

*Pigment

The following pigments a) to d) were respectively used to obtain recording liquids.

a) Black: Carbon black #45 (manufactured by Mitsubishi Kasei Corporation)

b) Cyan: C.I. Pigment Blue-15 (manufactured by Dainichiseika Color & Chemicals Mfg. Co., Ltd.)

c) Mazenta: C.I. Pigment Red-122 (manufactured by Dainippon Ink Kagaku Kogyo K.K.)

d) Yellow: C.I. Pigment Yellow-74 (manufactured by Dainichiseika Color & Chemicals Mfg. Co., Ltd.)

What is claimed is:

1. An image protecting film bonded to an image recorded on a porous recording medium by an ink jet recording system, which film comprises a light transmitting non-porous support of an aromatic polyester and a layer composed mainly of a polyester resin directly bonded to the support and also to the image recorded on said porous recording medium, said polyester being a copolymer comprising aliphatic dicarboxylic acid units, aromatic dicarboxylic acid units and aliphatic polyol units;

wherein the molar ration of the aliphatic dicarboxylic acid units to the aromatic dicarboxylic acid units in the polyester resin is from 8:2 to 2:8; and wherein said polyester resin has a softening point of from 50° to 130° C., a glass transition point of −30° to 40° C., a number-average molecular weight of from 5000 to 25,000 and a melt viscosity of rom 700 to 3,000 poise at 200° C.

2. The image protecting film according to claim 1, wherein the aliphatic dicarboxylic acid units of the polyester resin are derived from at least one aliphatic dicarboxylic acid selected from the group consisting of malonic acid, succinic acid, glutaric acid, adipic acid, sebacic acid, fumaric acid, maleic acid, itaconic acid and glutaconic acid.

3. The image protecting film according to claim 2, wherein the aliphatic dicarboxylic acid units of the polyester resin are derived from sebacic acid or adipic acid or a mixture thereof.

4. The image protecting film according to claim 1, wherein the aromatic dicarboxylic acid units of the polyester resin are derived from terephthalic acid or isophthalic acid or a mixture thereof.

5. The image protecting film according to claim 1, wherein the aliphatic polyol units of the polyester resin are derived from at least one polyol selected from the group consisting of ethylene glycol, propylene glycol, butylene glycol, hexylene glycol, diethylene glycol, polyethylene glycol, polypropylene glycol, neopentyl glycol and glycerol.

6. The image protecting film according to claim 1, wherein the polyester resin is a copolymer obtained by reacting an aliphatic dicarboxylic acid, an aromatic dicarboxylic acid and an aliphatic polyol in the presence of a catalyst.

7. The image protecting film according to claim 6, wherein the polyester resin is a copolymer of sebacic acid or adipic acid or a mixture thereof, terephthalic acid or isophthalic acid or a mixture thereof, and ethylene glycol or neopentyl glycol or a mixture thereof.

8. The image protecting film according to claim 1, wherein the light transmitting non-porous support is a film having a thickness of from 30 to 100 μm.

9. The image protecting film according to claim 1, wherein the layer composed mainly of the polyester resin formed on the non-porous support, has a dry thickness of from 5 to 40 μm.

* * * * *